C. B. BAUGHN.
GEAR SHIFTER.
APPLICATION FILED NOV. 15, 1916.

1,223,136.

Patented Apr. 17, 1917.
3 SHEETS—SHEET 1.

WITNESSES

INVENTOR
C. B. Baughn
BY
ATTORNEYS

C. B. BAUGHN.
GEAR SHIFTER.
APPLICATION FILED NOV. 15, 1916.

1,223,136.

Patented Apr. 17, 1917.
3 SHEETS—SHEET 2.

WITNESSES
Geo. W. Naylor
J. C. Larsen

INVENTOR
C. B. Baughn
BY
ATTORNEYS

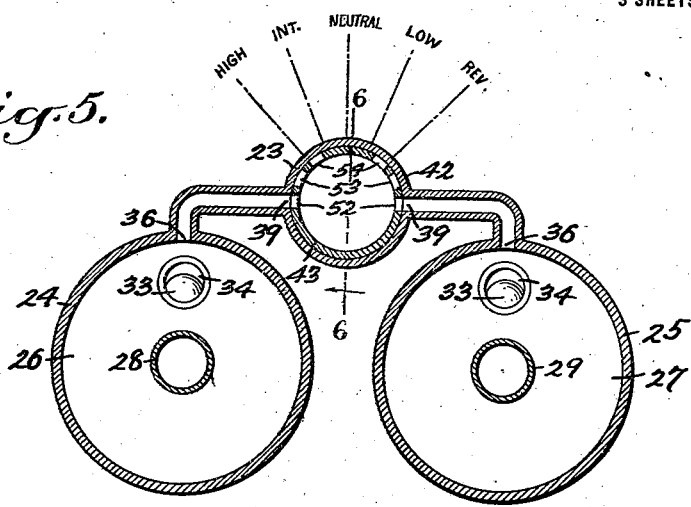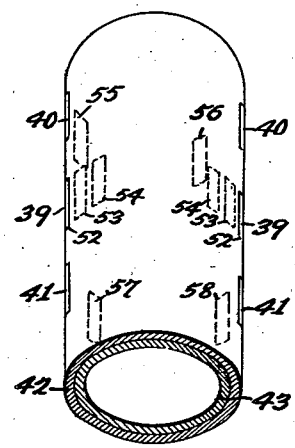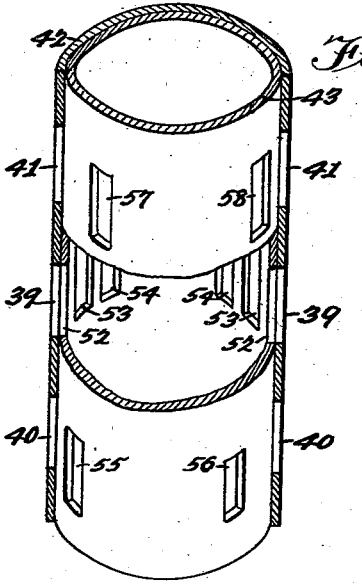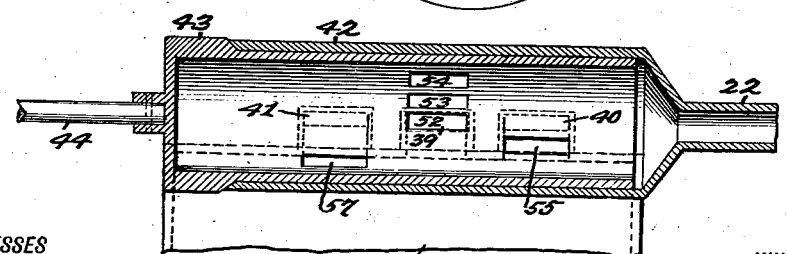

UNITED STATES PATENT OFFICE.

CHARLES B. BAUGHN, OF OILFIELDS, CALIFORNIA.

GEAR-SHIFTER.

1,223,136.  Specification of Letters Patent.  Patented Apr. 17, 1917.

Application filed November 15, 1916. Serial No. 131,407.

*To all whom it may concern:*

Be it known that I, CHARLES B. BAUGHN, a citizen of the United States, and a resident of Oilfields, in the county of Fresno and State of California, have invented certain new and useful Improvements in Gear-Shifters, of which the following is a specification.

My invention relates to means for shifting the transmission gears between an internal combustion engine and the point of power application, and is particularly adaptable for use on automobiles, one of the main objects thereof being to actuate the shifting means through the medium of the suction in the intake manifold of said engine.

Another object is to provide means for insuring the release of the clutch before the gears may be shifted, thus overcoming the liability of injury to the gears, and a further object is to provide means for insuring that only the desired gear shall be shifted.

My invention is fully described in the following specification, of which the accompanying drawings form a part, in which like characters refer to like parts in each of the views, and in which:—

Fig. 5 is a section taken through the two cylinders and the control valve, the latter being in neutral position;

Fig. 6 is a central longitudinal section taken through the control valve;

Fig. 7 is a fragmentary exterior view of the control valve, set in neutral; and

Fig. 8 is a fragmentary interior view of the control valve, also set in neutral, turned on a transverse axis from Fig. 7 to show at the rear the face of Fig. 7.

Figure 1:
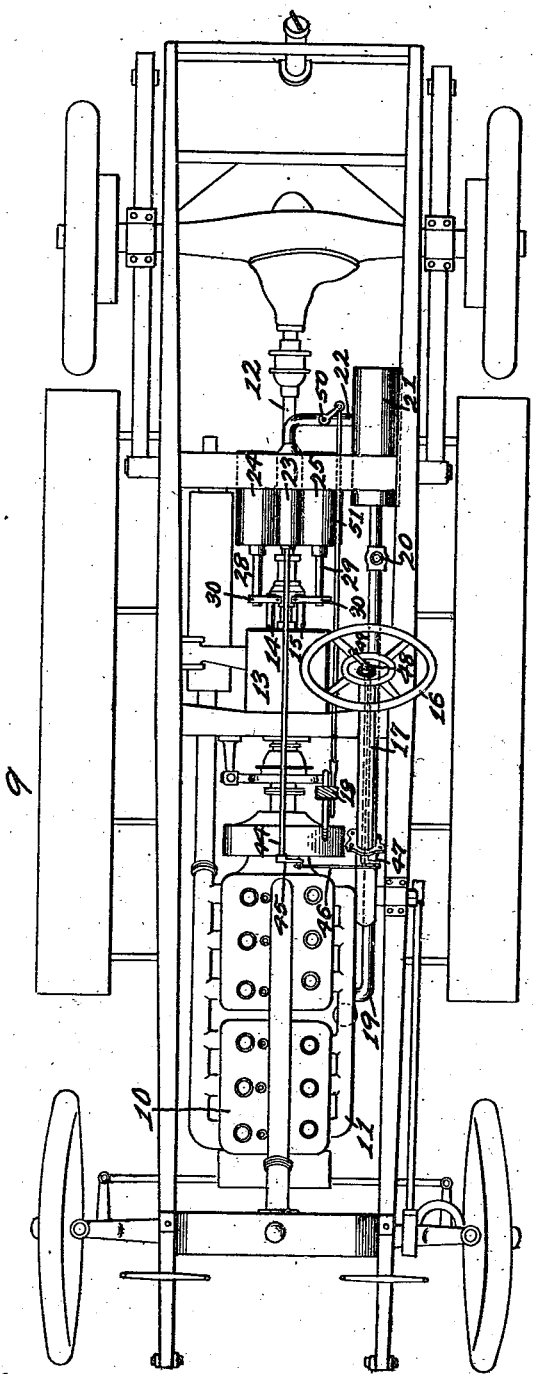
Figure 1 is a plan view of an automobile provided with my invention, the body of the automobile being removed.

Referring to the drawings, 9 represents an automobile provided with an engine 10 having an intake manifold 11, a drive-shaft 12, a gear case 13 having gear shifting countershafts 14 and 15 projecting therefrom, a steering wheel 16 on a column 17, and a clutch-pedal 18, none of these parts being shown in detail as they may be of any form.

Connected with the intake manifold 11 is a pipe 19 leading through a check-valve 20 to a vacuum tank 21, a pipe 22 leading from said tank to the control valve 23 arranged between cylinders 24 and 25 of identical construction and provided with pistons 26 and 27 the rods 28 and 29 of which are hollow and open at their outer ends and are joined to the respective countershafts 14 and 15 by means of brackets 30 of any desired form insuring the axial movement of said countershafts with the respective pistons.

Figure 2:
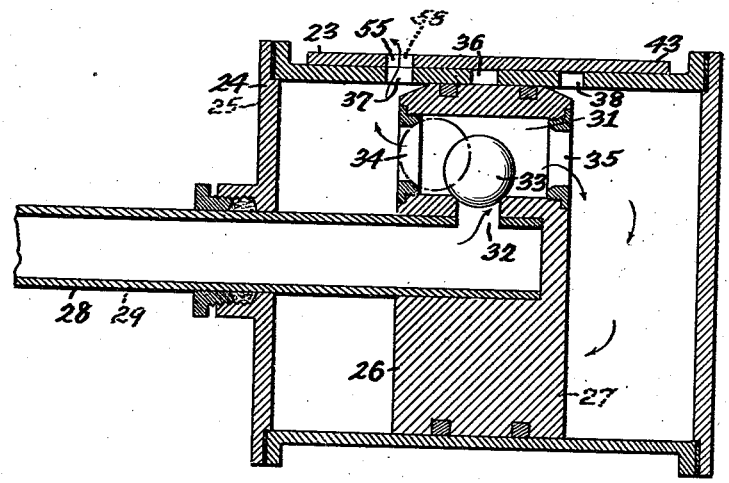
Fig. 2 is a sectional view taken through one of two cylinders which I employ, with a piston in neutral position, and with a valve shown diagrammatically thereon.
Figure 3:
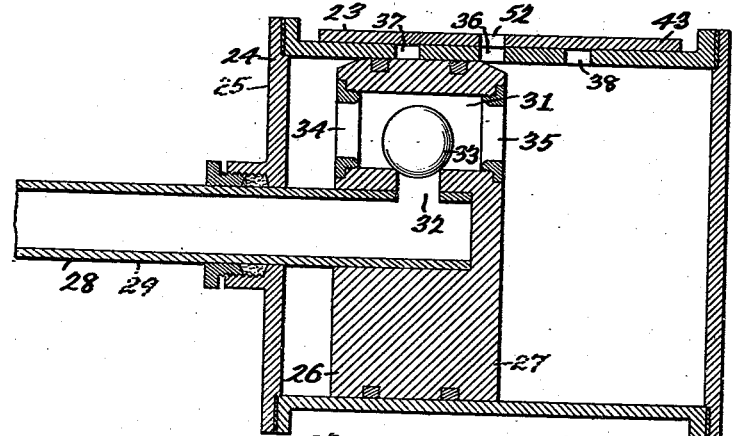
Fig. 3 is a similar section but showing the piston in a shifted position.
Figure 4:
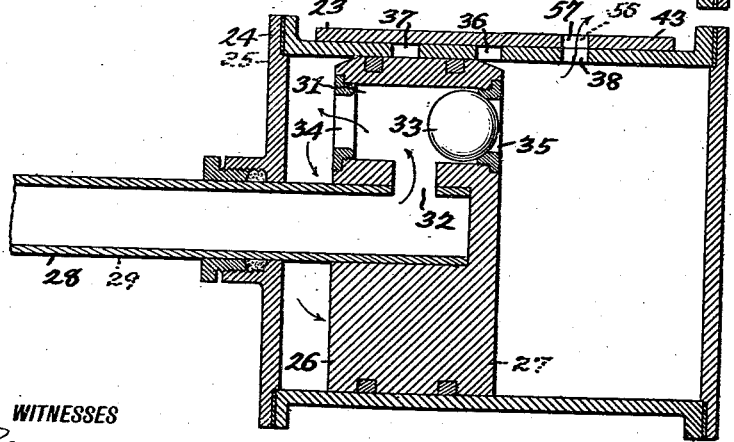
Fig. 4 is a similar section but showing the piston about to be returned toward and beyond neutral position.

As clearly shown in Figs. 2, 3 and 4, each piston has a chamber 31 therein connected with the passage through the piston rod by means of a port 32 normally closed by means of a ball-valve 33, and the opposite ends of the chamber 31 are ported at 34 and 35 serving as seats for the ball-valve for a reason to be explained.

Each cylinder 24 and 25 is provided with a central port 36 and with ports 37 and 38 on opposite sides thereof well removed from the cylinder ends though a sufficient distance from the central ports to be cleared by the piston in its movements in opposite directions and these ports 36, 37 and 38 are connected with ports 39, 40 and 41, respectively, on opposite sides of the shell 42 of the control valve 23 which shell is fixed with respect to the cylinders.

Rotatably mounted within the shell 42 is a tubular member 43 closed at its outer end and provided with an operating shaft 44 having a crank-arm 45 at its free end, Fig. 1, connected by means of a link 46 with a crank-arm 47 on a rod 48 shown as within the steering column and provided with an operating lever 49 in the position of the driver, as above the steering wheel 16, and it will be seen that actuation of the lever 49 will rotate the tubular member 43 correspondingly, and I provide a valve 50 for the pipe 22 and connect the same with the clutch pedal 18, as by a rod 51 whereby, when said clutch pedal is out, the valve 50 is open and when said clutch pedal is in the valve 50 is closed.

The tubular valve member 43 is provided, at opposite sides and in the plane of the central shell ports 39, with three neutral ports 52, 53 and 54, with ports 55 and 56 in the plane of the shell ports 40 and with ports 57 and 58 is the plane of the shell ports 41, for the purpose of explanation it being assumed that the port 55 is "low", the port 57 is "reverse", the port 58 is "intermediate", and the port 56 is "high".

From the neutral position shown in Figs. 5 to 8, inclusive, if it is desired to shift into "low", the valve 43 is moved clockwise, in Fig. 5, one space which carries the left hand neutral ports 52, 53 and 54 out of any possibility of registering with the ports 39 and 36 leading from the cylinder 24, thereby bringing the port 55 into register with the port 40 on the side toward the cylinder 24 while the neutral port 53 is brought into register with the ports 39 and 36 of the cylinder 25 thus maintaining the latter in neutral.

Before a shift can be accomplished it is necessary to open the valve 50 by throwing out the clutch as already explained and the suction from the tank 21 causes a partial vacuum in the cylinder 24 through the port 40 and port 37 of the cylinder 24, these last named ports being connected permanently and the ball-valve 33 is drawn to its seat in the piston port 34, atmospheric pressure on the right hand side of the piston moving the latter to the left as the air piston rod and port 32 and port 35 until the port 37 is covered by the piston, thereby causing the shift to "low", the valve member 43 being shown diagrammatically in Figs. 2, 3 and 4.

If the valve member 43 be now returned to neutral, Fig. 3, a partial vacuum is caused on the right hand side of the piston, the ball-valve 33 now being drawn to its seat in the port 35 and the gears are returned to neutral. If, instead, it is desired to shift to "reverse" the valve member 43 is rotated another step to bring the port 57 into register with the port 41 and the air is exhausted on the right hand side of the piston through the port 38 in permanent connection with the port 41, Fig. 4, and the piston moves to the right until it covers the port 38, the gears being shifted accordingly, and the neutral port 54 is carried into communication with the cylinder 25 thereby maintaining its piston in neutral position.

With the parts in "low", Fig. 3, if it is desired to move into "intermediate", the valve member 43 is reversed to bring the port 58 into register with the shell port 41 in permanent connection with the port 37 of the cylinder 25 and the piston 27 is moved accordingly and, when the member 43 is rotated another step the port 56 is brought into register with the port 40 in permanent connection with the port 38 of the cylinder 25 and the piston moves toward the opposite end of the last named cylinder to correspondingly shift the gears, the neutral ports 52, 53, or 54, always being in communication with the cylinder 24 in such gear shift to maintain the piston 26 in neutral position.

The foregoing illustrations are obviously subject to change without affecting the result but they show the mode of operation, and I do not seek to limit myself to the structural details shown and described, nor to the use of the gear shift for automobiles alone, but I do limit myself to the operation of the device by means of the suction caused by the engine in the intake piston strokes, although I also desire to reserve to myself the means for controlling the shifter from the driver's seat in an automobile, and the preventive means under the control of the clutch pedal.

Having fully described my invention, what I claim as new, and desire to secure by Letters Patent, is:—

1. The combination with the intake manifold of an internal combustion engine, a drive shaft, and transmission gears; of means actuated by the suction in said manifold for shifting said gears.

2. The combination with the intake manifold of an internal combustion engine, a drive shaft, and transmission gears; of a plurality of reciprocating members in operable connection with said gears, and means in operable connection with said manifold for actuating said members by the suction in said manifold.

3. The combination with the intake manifold of an internal combustion engine, a drive shaft, and transmission gears; of a plurality of cylinders, pistons therein in operable connection with said gears, and means for exhausting air from either end of either cylinder through the medium of said manifold to correspondingly move either of said pistons to shift said gears.

4. The combination with the intake manifold of an internal combustion engine, a drive shaft, and transmission gears; of a plurality of cylinders, pistons therein in operable connection with said gears, means for exhausting air from either end of either cylinder through the medium of said manifold to correspondingly move either piston to shift said gears, and valve controlled means for admitting air through either piston to its cylinder at the end opposite to that from which the air is being exhausted.

5. The combination with the intake manifold of an internal combustion engine, a drive shaft, and transmission gears; of a plurality of cylinders, pistons therein in operable connection with said gears, means for exhausting air from either end of either cylinder through the medium of said manifold to correspondingly move the respective piston to shift said gears, and means for maintaining each of said cylinders neutral in the piston operation of the other cylinder.

6. In an automobile provided with an internal combustion engine, an intake manifold, a drive shaft, transmission gears, and a steering wheel; means actuated by the suction in said manifold for shifting said gears, and means adjacent said steering wheel for controlling said actuating means.

7. In an automobile provided with an internal combustion engine, an intake manifold, a drive shaft, transmission gears, and a clutch pedal; means actuated by the suction in said manifold for shifting said gears, and means connected with said pedal for rendering said actuating means inoperative when said pedal is in normal position.

8. In a device of the class described, a cylinder, a piston therein provided with a hollow rod open to the outer air and provided with a chamber opening through opposite sides thereof, a ball-valve normally closing said chamber from said piston rod and adapted to close said chamber from either end of said cylinder, and means for exhausting air from either end of said cylinder to actuate said piston.

CHARLES B. BAUGHN.